United States Patent
Chen et al.

(10) Patent No.: US 9,273,793 B2
(45) Date of Patent: Mar. 1, 2016

(54) MAGNETIC VALVE AND FLUID SUPPLY SYSTEM USING THE SAME

(75) Inventors: Chien-An Chen, Taipei (TW); Chien-Wei Wu, Taipei (TW)

(73) Assignee: INVENTEC CORPORATION, Taipei (TW)

( * ) Notice: Subject to any disclaimer, the term of this patent is extended or adjusted under 35 U.S.C. 154(b) by 1016 days.

(21) Appl. No.: 13/404,567

(22) Filed: Feb. 24, 2012

(65) Prior Publication Data

US 2013/0146794 A1    Jun. 13, 2013

(30) Foreign Application Priority Data

Dec. 13, 2011   (TW) .............................. 100145951 A

(51) Int. Cl.
*F16K 3/26*      (2006.01)
*F16K 5/04*      (2006.01)
*F16K 31/08*     (2006.01)

(52) U.S. Cl.
CPC ................. *F16K 31/088* (2013.01); *F16K 3/26* (2013.01); *F16K 5/0414* (2013.01); *F16K 5/0442* (2013.01); *Y10T 137/8671* (2015.04)

(58) Field of Classification Search
USPC .................... 251/65, 205, 208, 209, 344, 345
See application file for complete search history.

(56) References Cited

U.S. PATENT DOCUMENTS

| | | | | |
|---|---|---|---|---|
| 2,346,904 A | * | 4/1944 | Carlson | 251/65 |
| 2,449,833 A | * | 9/1948 | Barnes | 251/209 |
| 3,502,099 A | * | 3/1970 | Wilson | 137/495 |
| 4,878,085 A | * | 10/1989 | Ward et al. | 355/47 |
| 5,620,166 A | * | 4/1997 | Lord et al. | 251/267 |
| 8,654,532 B2 | * | 2/2014 | Chen et al. | 361/701 |
| 2012/0119124 A1 | * | 5/2012 | Lauridsen | 251/209 |

* cited by examiner

*Primary Examiner* — Kevin Murphy
*Assistant Examiner* — Jonathan Waddy
(74) *Attorney, Agent, or Firm* — CKC & Partners Co., Ltd.

(57) ABSTRACT

A magnetic valve and a fluid supply system using the same are provided. The fluid supply system includes a flow channel and the magnetic valve. The magnetic valve penetrates through a pipe wall of the flow channel, and includes a driving unit, a first magnet and a second magnet, a cover plate, a first and second spools. A first leaning portion of the first spool is disposed at one end of a first sheath portion. The first sheath portion has a first outlet opening. The second magnet is disposed on a surface of the first leaning portion facing to the cover plate. The second spool sleeves the first spool and has a second outlet opening. The first spool rotates relative to the second spool through a magnetic force to control an overlapping area of the first and second outlet openings, so as to control a flow rate.

18 Claims, 10 Drawing Sheets

MAGNETIC VALVE AND FLUID SUPPLY SYSTEM USING THE SAME

CROSS-REFERENCE TO RELATED APPLICATION

This application claims the priority benefit of Taiwan application serial no. 100145951, filed on Dec. 13, 2011. The entirety of the above-mentioned patent application is hereby incorporated by reference herein and made a part of this specification.

BACKGROUND OF THE INVENTION

1. Field of the Invention

The invention relates to a valve and a fluid supply system. Particularly, the invention relates to a magnetic valve and a fluid supply system using the magnetic valve.

2. Description of Related Art

A valve is a device used for controlling a flow rate. In a commonly used apparatus, if a flow rate of a fluid in a flow channel is required to be controlled, the valve is generally installed in the flow channel to control the flow rate of the fluid. For example, a simple valve is used in intravenous drip to control a flow speed and flow rate of medicament, so as to inject the medicament according to an individual status of a patient. Alternatively, some fluid-related experiments are carried on in laboratory researches, and the valve is generally used to change or control the flow rate of the fluid that serves as a variable to obtain experiment results. Alternatively, in a portrait-type server rack, since a fluid is used to serve as a cooling medium, and the fluid has different potential energy at different heights that may influence the flow rate, in the cooling fluid loop, the valve is used to control the fluid of different heights to achieve the same flow rate.

Taking the valve used in a mechanical equipment (for example, a fluid experiment equipment or a server rack) as an example, two hollow spools are sleeved to each other, and one of the spools is connected to a motor, and another spool is fixed on the flow channel, and when the motor drives the spool to rotate, the spool connected to the motor is rotated relative to the spool fixed on the flow channel, so that an overlapping area of outlet openings of the two spools is varied to determine the flow rate of the fluid.

It should be noticed that in order to prevent the fluid leaking out from a space between the two spools, an O-ring is generally disposed between the two spools. However, configuration of the O-ring increases difficulty in relative rotation of the two spools. If a good sealing effect is achieved to prevent the fluid leakage, an extremely large force has to be used to implement the relative rotation between the two spools. Alternatively, if the relative rotation between the two spools is smoothly achieved, the contact between two spools and the O-ring cannot be too tight, which influences the sealing effect.

SUMMARY OF THE INVENTION

The invention is directed to a magnetic value having a good sealing effect.

The invention is directed to a fluid supply system having a good flow rate controlling effect.

The invention provides a magnetic valve including a driving unit, at least one first magnet, a cover plate, a first spool, a second spool and at least one second magnet. The driving unit has a first surface, and the first magnet is disposed on the first surface of the driving unit. The cover plate has a second surface and a third surface opposite to the second surface, and the first surface of the driving unit faces to the second surface of the cover plate, where a magnetic pole of the first magnet that faces to the second surface is N or S. The first spool has a first leaning portion and a first sheath portion, where a normal direction of the first leaning portion is parallel to an axial direction of the first sheath portion, and the first sheath portion has a first outlet opening. The second magnet is disposed on a fourth surface of the first leaning portion that faces to the third surface, and a magnetic pole of the second magnet that faces to the third surface is opposite to the magnetic pole of the first magnetic that faces to the second surface. The second spool sleeves the first spool and has a second outlet opening. When the driving unit rotates while the second spool is fixed, a magnetic force of the first magnet and the second magnet drives the first spool to rotate relative to the second spool, so as to control an overlapping area of the first outlet opening and the second outlet opening.

The invention provides a fluid supply system including a flow channel and the aforementioned magnetic valve. The flow channel has a pipe wall, and the magnetic valve penetrates through the pipe wall of the flow channel to control a flow rate of the fluid in the flow channel.

In an embodiment of the invention, a motor and a transmission member are further included, and the motor and the transmission member are connected to drive the driving unit to rotate.

In an embodiment of the invention, the first surface of the driving unit has a first engaging portion, the second surface of the cover plate has a first containing slot, and the first engaging portion is correspondingly contained in the first containing slot. Moreover, the first engaging portion has at least one first magnet containing slot, and the first magnet is correspondingly disposed in the first magnet containing slot.

In an embodiment of the invention, the top plate further has a second engaging portion, and the second engaging portion protrudes out from the third surface. Moreover, the second engaging portion has a convex pillar on a fifth surface facing to the first leaning portion, an edge of the first leaning portion has a position limiting gap, and the convex pillar is disposed in the position limiting gap to limit a rotation angle of the first spool relative to the cover plate.

In an embodiment of the invention, the magnetic valve further includes at least one O-ring, and the O-ring sleeves the second engaging portion.

In an embodiment of the invention, the fourth surface of the first leaning portion has at least one second magnet containing slot, and the second magnet is correspondingly disposed in the second magnet containing slot.

In an embodiment of the invention, a number of the first magnets is two, a number of the second magnets is also two, where magnetic poles of the first magnets that face to the cover plate are the same, magnetic poles of the second magnets that face to the cover plate are also the same, and the magnetic poles of the first magnet and the second magnet that face to each other are different for attraction.

In an embodiment of the invention, a number of the first magnets is two, a number of the second magnets is also two, where magnetic poles of the first magnets that face to the cover plate are different, magnetic poles of the second magnets that face to the cover plate are also different, and the magnetic poles of the first magnet and the second magnet that face to each other are different for attraction.

In an embodiment of the invention, the greater the overlapping area of the first outlet opening and the second outlet opening is, the greater the flow rate of the fluid in the flow channel is.

In an embodiment of the invention, a surface facing to the first leaning portion of the second engaging portion has a convex pillar, an edge of the first leaning portion has a position limiting gap, and the convex pillar is disposed in the position limiting gap to limit a rotation angle of the first spool relative to the cover plate.

In an embodiment of the invention, the second spool further has a positioning gap, which is communicated to the position limiting gap of the first leaning portion, where shapes and sizes of the convex pillar and the positioning gap are matched, and the convex pillar and the positioning gap are engaged to each other to fix a relative position between the cover plate and the second spool.

In an embodiment of the invention, the second spool has a second leaning portion, a second sheath portion and a slit. The second leaning portion and the first leaning portion are sleeved to each other, the second leaning portion is disposed at one end of the second sheath portion, the second sheath portion has the second outlet opening, the slit is disposed on the second sheath portion and is located aside the second outlet opening, and the slit penetrates through the second sheath portion along an axial direction of the second sheath portion.

According to the above descriptions, the invention provides a magnetic valve with a structure totally different to that of the conventional valve, and the magnetic valve is used in the fluid supply system. Since none O-ring is disposed between the two spools, hard relative rotation between the two spools due to the influence of the O-ring is avoided, and the flow rate of the fluid in the flow channel is effectively controlled. Moreover, the O-ring is disposed between the engaging portion of the cover plate and the pipe wall, which is not influenced by the relative rotation of the two spools, and may effectively prevent the fluid leaking from the pipe wall of the fluid system.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1:
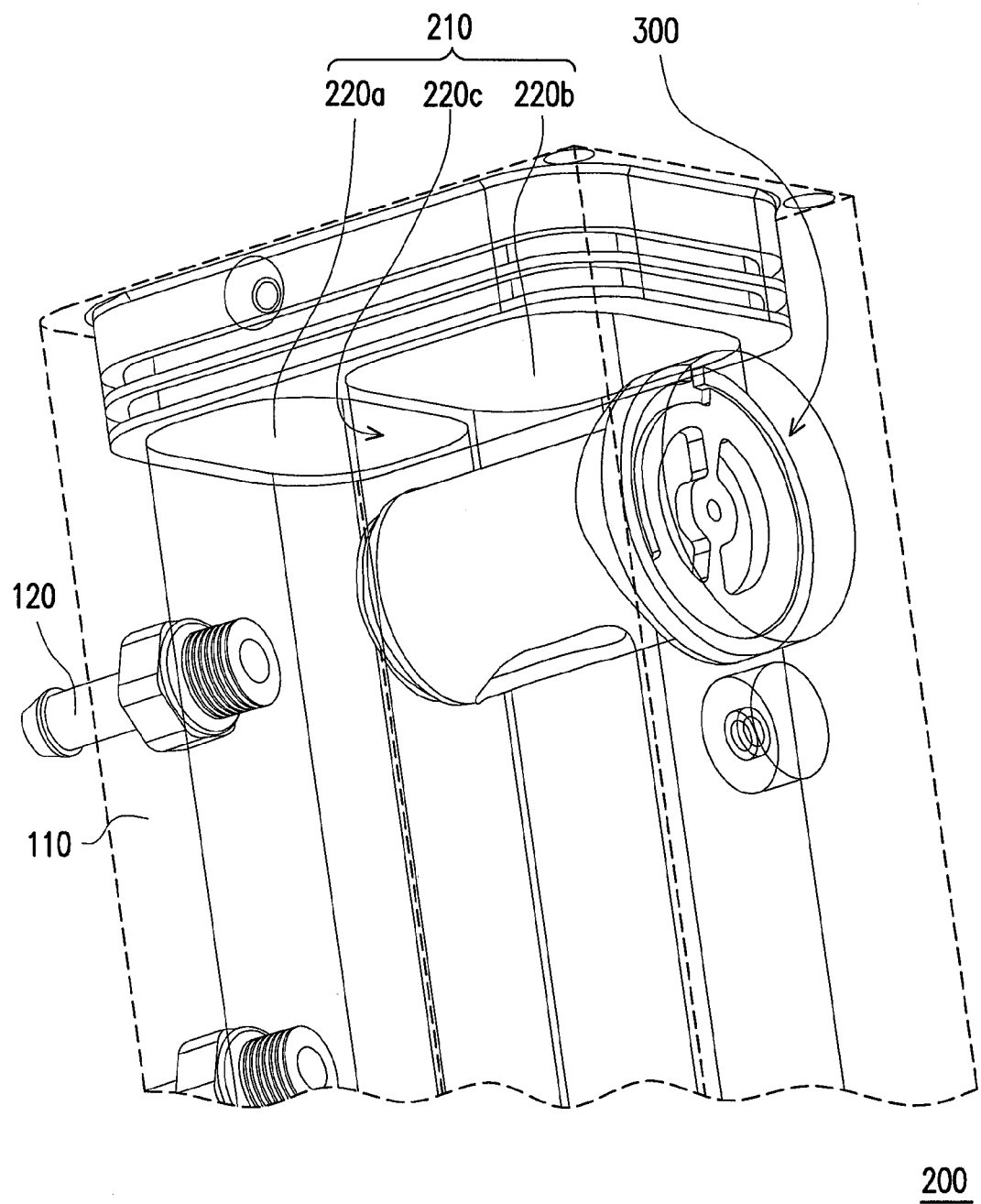
FIG. 1 is a schematic diagram of a fluid supply system according to a first embodiment of the invention.
Figure 2:
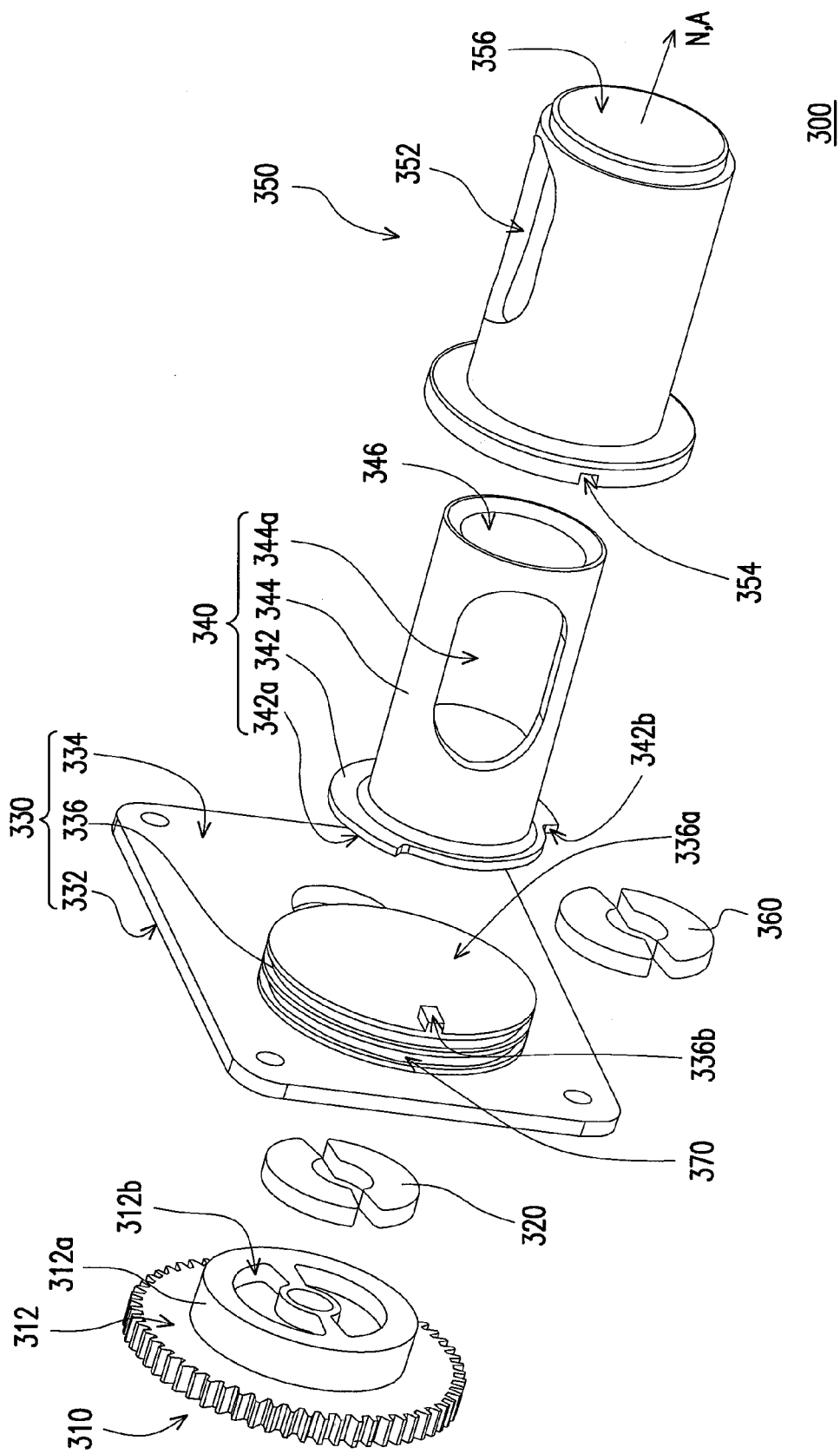
FIG. 2 is an exploded view of a magnetic valve applied in the fluid supply system of FIG. 1.

A magnetic valve of the invention can be applied to any fluid supply system required to control a flow rate of a fluid, where the fluid can be liquid or gas. The fluid supply system having the magnetic valve is described below. FIG. 1 is a schematic diagram of the fluid supply system according to a first embodiment of the invention, and FIG. 2 is an exploded view of the magnetic valve applied in the fluid supply system of FIG. 1. Referring to FIG. 1 and FIG. 2, the fluid supply system 200 of the present embodiment is installed on a server rack, and the fluid supply system 200 includes a casing 110, a fluid injection member 120, a heat pipe (not shown), a flow channel 210 and a magnetic valve 300. The fluid injection member 120 is installed on the casing 110 and is connected to the flow channel 210 for transporting the fluid flowed in the flow channel 210. The flow channel 210 is composed of two pipes 220a and 220b separated from each other.

As described above, the magnetic valve 300 penetrating through a pipe wall 220C between the two pipes 220a and 220b of the flow channel 210 includes a driving unit 310, at least one first magnet 320, a cover plate 330, a first spool 340, a second spool 350 and at least one second magnet 360. The driving unit 310 has a first surface 312, and the first magnet 320 is disposed on the first surface 312 of the driving unit 310. The cover plate 330 has a second surface 332 and a third surface 334 opposite to the second surface 332, and the first surface 312 of the driving unit 310 faces to the second surface 332 of the cover plate 330. The first spool 340 has a first leaning portion 342 and a first sheath portion 344, where the first leaning portion 342 is disposed at one end of the first sheath portion 344, and a normal direction N of the first leaning portion 342 is parallel to an axial direction A of the first sheath portion 344, and the first sheath portion 344 has a first outlet opening 344a. The second magnet 360 is disposed on a fourth surface 342a of the first leaning portion 342 that faces to the third surface 334. The second spool 350 has a second outlet opening 352, and the second spool 350 sleeves the first spool 340, and the first spool 340 is position-limited by the second spool 350, so that the first spool 340 cannot move along the axial direction A. Moreover, the second spool 350 has an opening 356, and the first spool 340 has a third outlet opening 346. The first spool 340 penetrates through the opening 356 of the second spool 350, and the third outlet opening 346 is communicated to the pipe 220a, and the second outlet opening 352 of the second spool 350 is communicated to the pipe 220b.

Figure 3:
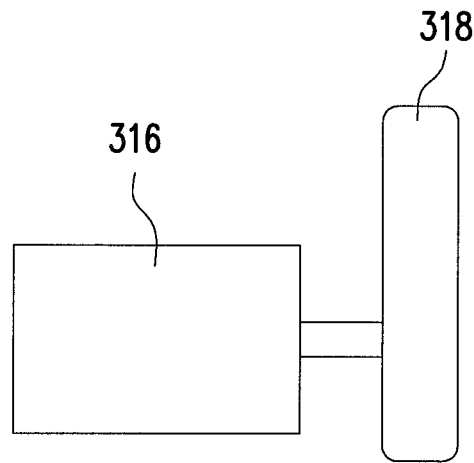
FIG. 3 is a schematic diagram of a motor and a transmission member used for driving a driving unit.

According to the above descriptions, the driving unit 310 is a gear, and a user can manually drive the gear to rotate through mechanical devices. As shown in FIG. 3, the magnetic valve 300 further includes a motor 316 and a transmission member 318, where the transmission member 318 can also be a gear, the transmission member 318 is engaged to the driving unit 310, and the motor 316 drives the transmission member 318 to rotate and accordingly drive the driving unit 310 to rotate.

Figure 4:
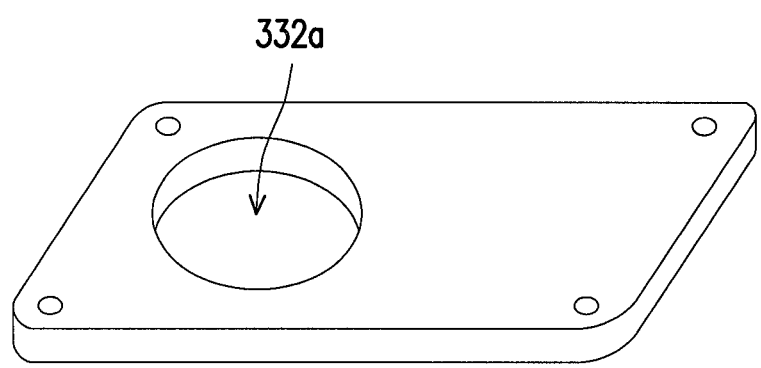
FIG. 4 is a schematic diagram of a cover plate of FIG. 2 viewed from another viewing angle.

FIG. 4 is a schematic diagram of the cover plate of FIG. 2 viewed from another viewing angle. Referring to FIG. 2 and FIG. 4, the first surface 312 of the driving unit 310 has a first engaging portion 312a, and the second surface 332 of the cover plate 330 has a first containing slot 332a, and the first engaging portion 312a is correspondingly contained in the first containing slot 332a. Moreover, the first engaging portion 312a has at least one first magnet containing slot 312b, and the first magnet 320 is correspondingly disposed in the first magnet containing slot 312b.

Moreover, the cover plate 330 further has a second engaging portion 336, and the second engaging portion 336 protrudes out from the third surface 334. Moreover, a fifth surface 336a facing to the first leaning portion 342 of the second engaging portion 336 has a convex pillar 336b, and an edge of the first leaning portion 342 has a position limiting gap 342b, and when the first spool 340 sleeves the second engaging portion 336 of the cover plate 330, the convex pillar 336b is disposed in the position limiting gap 342b to limit a rotation angle of the first spool 340 relative to the cover plate 330. The magnetic valve 300 further includes an O-ring 370, and the O-ring 370 sleeves the second engaging portion 336, and is disposed between the second engaging portion 336 and the pipe wall 220c to seal a space between the second engaging portion 336 and the pipe wall 220c.

Further, the second spool 350 further has a positioning gap 354, and when the first spool 340 is sleeved by the second spool 350, the positioning gap 354 is communicated to the position limiting gap 342b of the first leaning portion 342, where shapes and sizes of the convex pillar 336b and the positioning gap 354 are matched, so that when the first spool 340, the second spool 350 and the cover plate 330 are assembled, the convex pillar 336b located on the fifth surface 336a of the second engaging portion 336 of the cover plate 330 is tightly inlaid to the positioning gap 354 to fix a relative position between the cover plate 330 and the second spool 350, and the second spool 350 cannot rotate relative to the cover plate 330.

Figure 5:
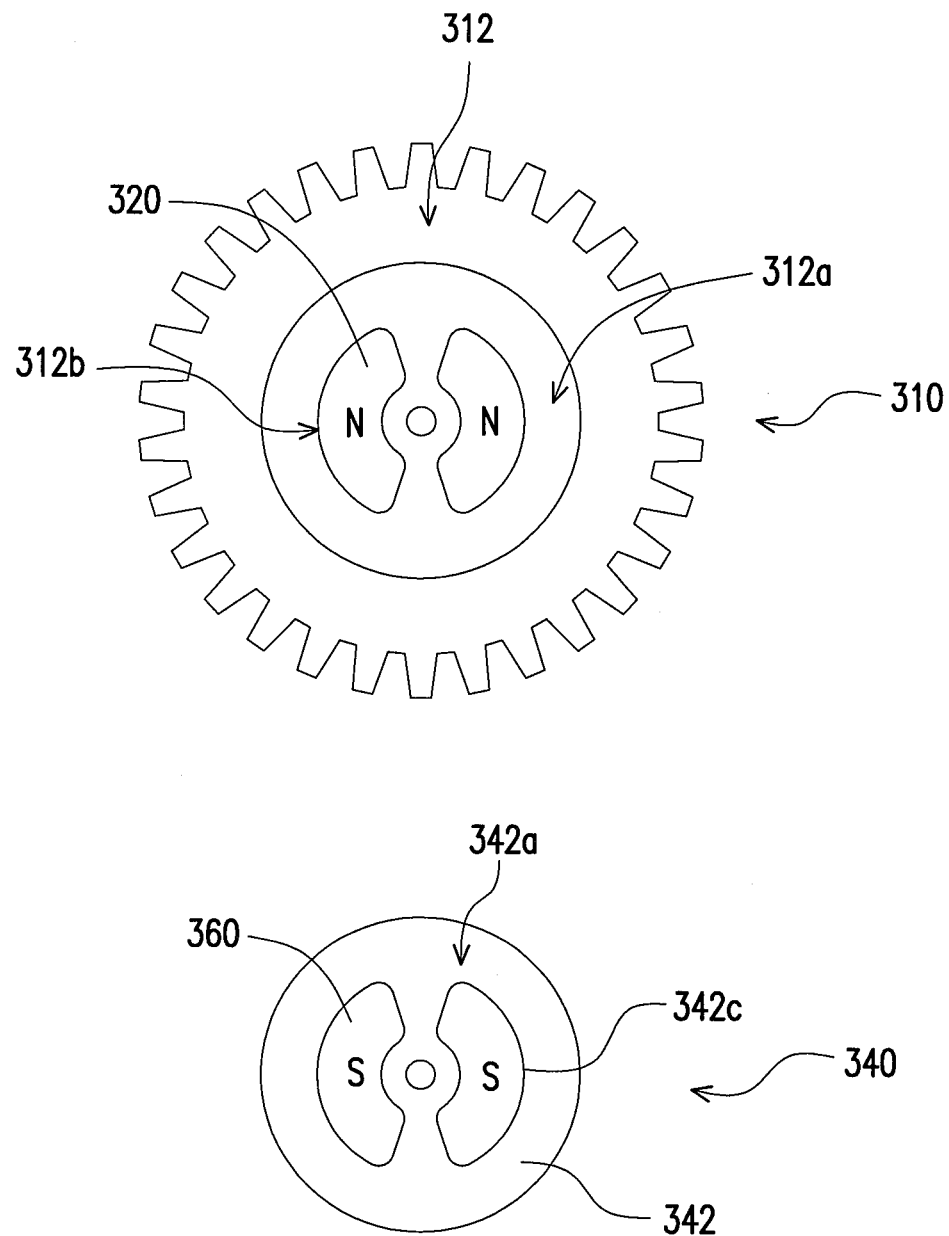
FIG. 5 is a schematic diagram of a first magnet and a second magnet respectively disposed in a driving unit and a first spool.

FIG. 5 is a schematic diagram of a first magnet and a second magnet respectively disposed in the driving unit and the first spool. Referring to FIG. 2 and FIG. 5, the fourth surface 342a of the first leaning portion 342 of the first spool 340 has at least one second magnet containing slot 342c, and the second magnet 360 is correspondingly disposed in the second magnet containing slot 342c.

Referring to FIG. 2 and FIG. 5, in the present embodiment, there are two first magnets 320 and two second magnets 360, wherein magnetic poles of the two first magnets 320 that face to the cover plate 330 are the same, and magnetic poles of the two second magnets 360 that face to the cover plate 330 are also the same, though the magnetic poles of the first magnet 320 and the second magnet 360 that face to each other are different for attraction. In detail, the magnetic poles of the two first magnets 320 disposed in the first magnet containing slot 312b that face to the second surface 332 are all N-pole, and the magnetic poles of the two second magnets 360 disposed in the second magnet containing slot 342c that face to the third surface 334 are all S-pole.

Figure 6:
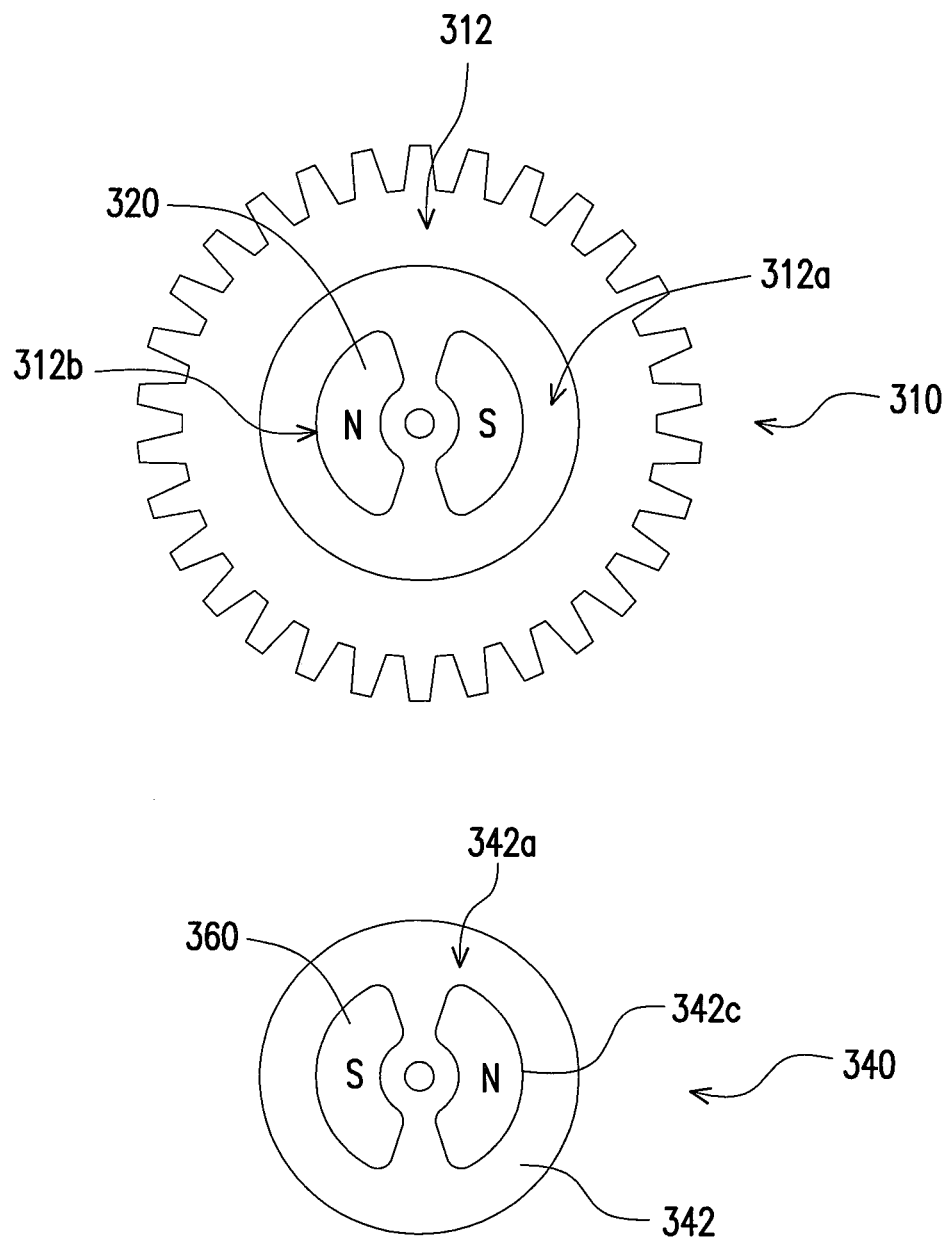
FIG. 6 illustrates another disposing method of magnets.

FIG. 6 illustrates another disposing method of the magnets. Referring to FIG. 6, in another embodiment, the magnetic poles of the first magnets 320 that face to the cover plate 330 are different, and the magnetic poles of the second magnets 360 that face to the cover plate 330 are also different, and the magnetic poles of the first magnet 320 and the second magnet 360 that face to each other are different for attraction. Further, regarding the two first magnets 320 disposed in the first magnet containing slot 312b, the magnetic pole of one of the first magnets 320 that faces to the second surface 332 of the cover plate 330 is N-pole, and the magnetic pole of another one of the first magnets 320 that faces to the second surface 332 of the cover plate 330 is S-pole. Regarding the two second magnets 360 disposed in the second magnet containing slot 342c on the fourth surface 342a of the first leaning portion 342 of the first spool 340, the magnetic pole of one of the second magnets 360 that faces to the third surface 334 of the cover plate 330 is S-pole, and the magnetic pole of another one of the second magnets 360 that faces to the third surface 334 of the cover plate 330 is N-pole. The S-pole of the first magnet 320 is disposed corresponding to the N-pole of the second magnet 360, and the N-pole of the first magnet 320 is disposed corresponding to the S-pole of the second magnet 360.

In this way, when the driving unit 310 rotates, the driving unit 310 drives the first spool 340 to rotate through a magnetic force. Certainly, although magnetic attraction of different magnetic poles is used to control the first spool 340 to rotate relative to the second spool 350, those skilled in the art should understand that magnetic repulsion of the magnets can also be used to control the first spool 340 to rotate relative to the second spool 350.

Figure 7:
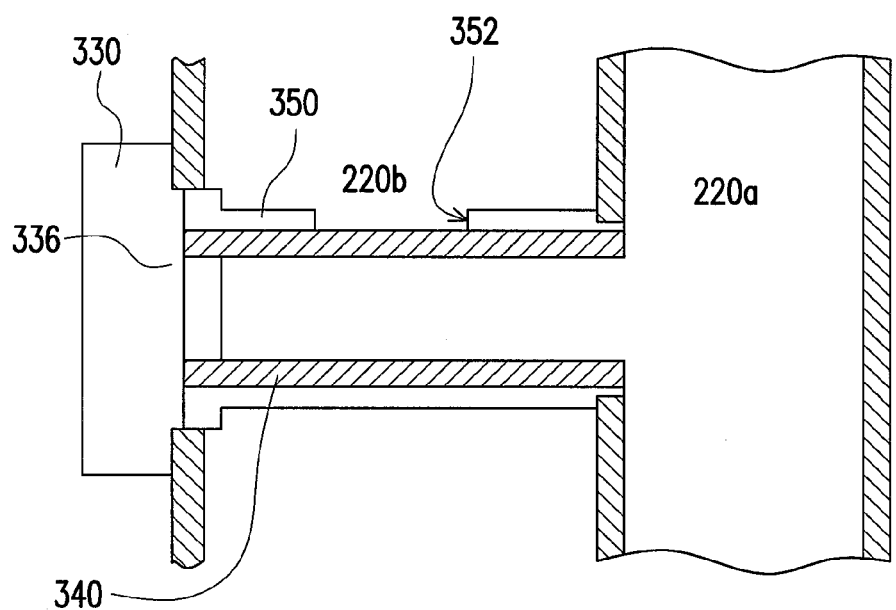
FIG. 7 is a cross-sectional view of the magnetic valve of FIG. 2 used in a fluid supply system and having in a first state.
Figure 8:
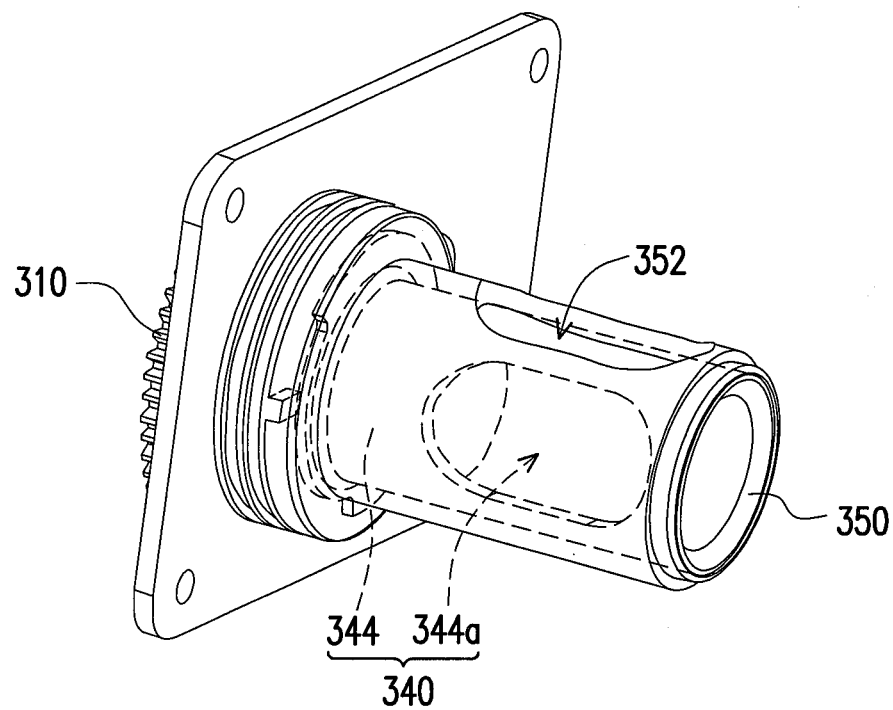
FIG. 8 is a three-dimensional view of the magnetic valve of FIG. 7.

FIG. 7 is a cross-sectional view of the magnetic valve of FIG. 2 used in a fluid supply system and having in a first state, and FIG. 8 is a three-dimensional view of the magnetic valve of FIG. 7. Referring to FIG. 1, FIG. 7 and FIG. 8, in the first state, the first outlet opening 344a of the first sheath portion 344 of the first spool 340 and the second outlet opening 352 of the second spool 350 have no overlapping portion, and the magnetic valve 300 isolates the pipe 220a and the pipe 220b without communication, so that the fluid cannot flow between the pipe 220a and the pipe 220b, and the fluid injection member 120 cannot supply, the fluid.

Figure 9:
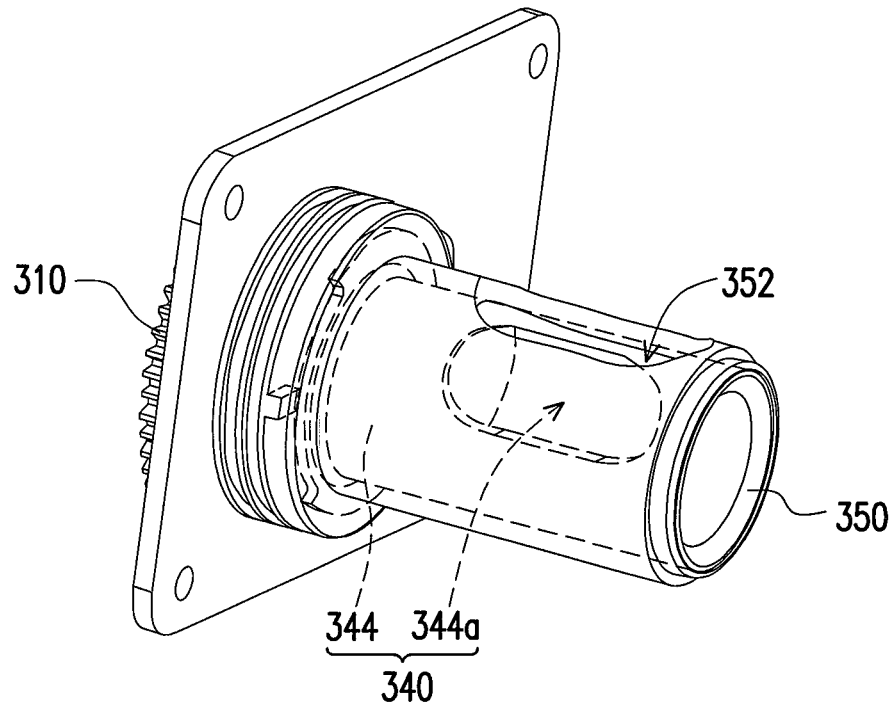
FIG. 9 is a three-dimensional view of the magnetic valve of FIG. 8 in a second state.
Figure 10:
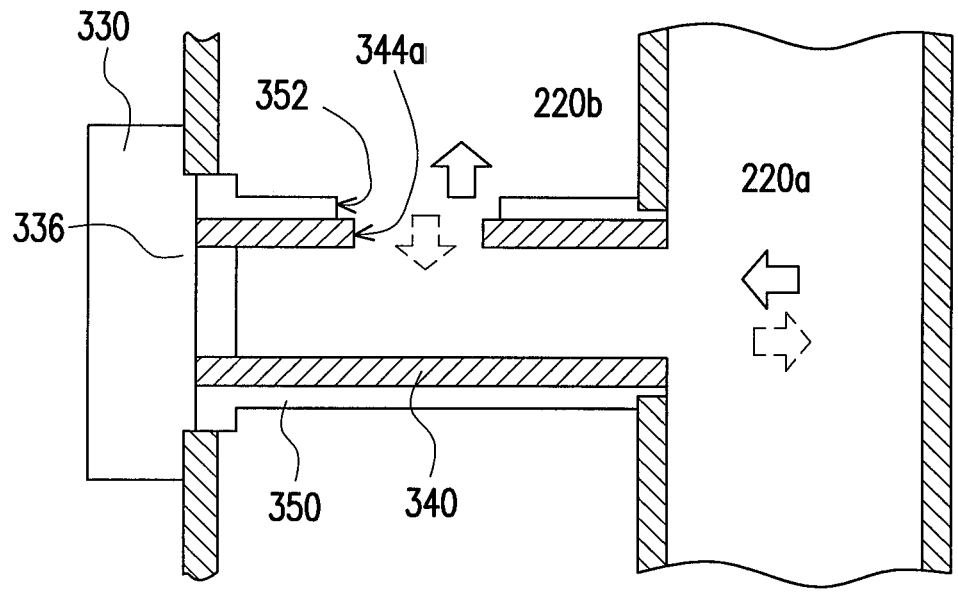
FIG. 10 is a cross-sectional view of the magnetic valve of FIG. 9 in the second state, in which a fluid flows in a fluid supply system.

FIG. 9 is a three-dimensional view of the magnetic valve of FIG. 8 in a second state, and FIG. 10 is a cross-sectional view of the magnetic valve of FIG. 9 in the second state, in which the fluid flows in the fluid supply system. Referring to FIG. 1, FIG. 9 and FIG. 10, to make the fluid injection member 120 to provide the fluid, the driving unit 310 is first rotated, and the driving unit 310 can be rotated through a manual manner or an electric manner, which is determined according to an actual design requirement. Due to the magnetic force between the first magnets 320 (shown in FIG. 2) and the second magnets 360 (shown in FIG. 2), when the first magnets 320 (shown in FIG. 2) rotate along with the rotation of the driving unit 310, the second magnets 360 (shown in FIG. 2) driven by the magnetic force drive the first spool 340 to rotate relative to the second spool 350, and due to the engagement of the convex pillar 336b (shown in FIG. 2) and the positioning gap 354 (shown in FIG. 2), the second spool 350 does not rotate relative to the cover plate 330. As the first spool 340 rotates relative to the second spool 350, the first outlet opening 344a and the second outlet opening 352 are gradually overlapped, and the fluid flows in the pipe 220b and the pipe 220a through the overlapping area of the first outlet opening 344a and the second outlet opening 352 and the third outlet opening 346 communicated to the first outlet opening 344a. A flowing direction of the fluid is not limited, and the fluid can flow from the pipe 220a to the pipe 220b through the magnetic valve 300, or flow from the pipe 220b to the pipe 220a through the magnetic valve 300, which is set by the user when the fluid supply system 200 works.

It should be noticed that in the magnetic valve 300 of the present embodiment, the O-ring 370 is not disposed between the first spool 340 and the second spool 350 that can rotate relative to each other, so that the first spool 340 and the second spool 350 can smoothly rotate relative to each other. Moreover, the O-ring 370 is disposed on the second engaging portion 336 of the cover plate 330, where since the second engaging portion 336 is embedded in the pipe wall 220c of the pipe 220b, when the magnetic valve 300 is applied in the fluid supply system 200, the O-ring 370 is located between the second engaging portion 336 and the pipe wall 220c, and since the cover plate 330 is unnecessary to rotate relative to the pipe wall 220c of the pipe 220b, a required sealing effect of the O-ring 370 is achieved, which can effectively prevent the fluid from leakage.

According to the above descriptions, by applying the magnetic valve 300 in the fluid supply system 200, the first spool 340 and the second spool 350 can smoothly rotate relative to each other, and the fluid can be sealed in the flow channel 210 without leakage.

Figure 11:
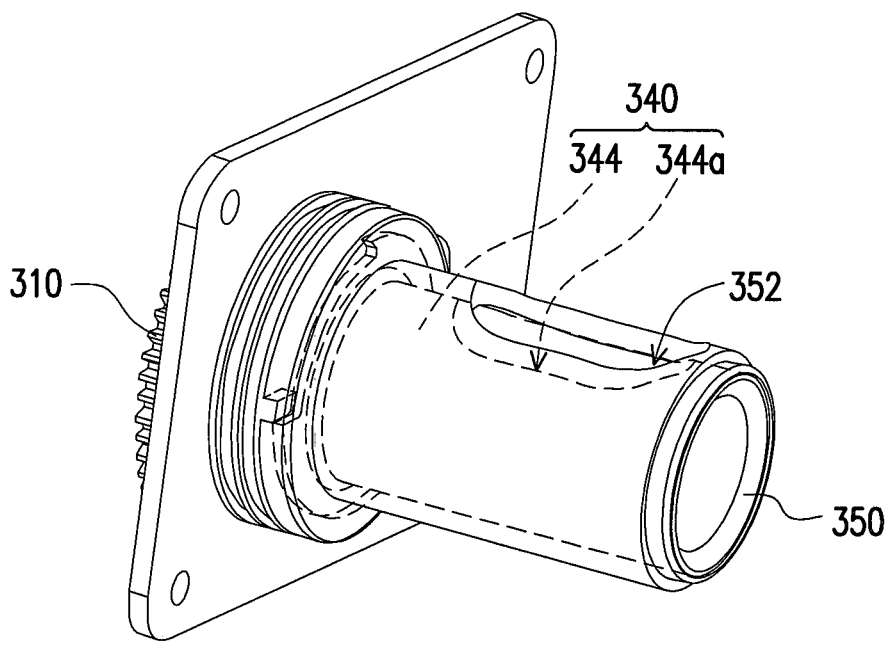
FIG. 11 is a three-dimensional view of complete overlapping of a first outlet opening of a first sheath portion of a first spool and a second outlet opening of a second spool of FIG. 10.

FIG. 11 is a three-dimensional view of complete overlapping of the first outlet opening of the first sheath portion of the first spool and the second outlet opening of the second spool. Referring to FIG. 1, FIG. 2 and FIG. 11, the driving unit 310 can continually rotate to completely overlap the first outlet opening 344a and the second outlet opening 352. Now, since the overlapping area of the first outlet opening 344a and the second outlet opening 352 becomes the largest, a flow rate of the fluid flowing through the magnetic valve 300 is the highest. Moreover, configuration of the convex pillar 336b on the fifth surface 336a of the second engaging portion 336 and the position limiting gap 342b of the first leaning portion 342 can limit a rotation angle of the first spool 340 relative to the second spool 350, so that the user may have a general concept of related positions of the first outlet opening 344a and the second outlet opening 352 during operation. When the convex pillar 336b leans against one side of the position limiting gap 342b, the first outlet opening 344a and the second outlet opening 352 are not overlapped completely, and when the convex pillar 336b leans against another side of the position limiting gap 342b, the first outlet opening 344a and the second outlet opening 352 are overlapped completely. In other words, when the convex pillar 336b leans against a side of the position limiting gap 342b, the fluid in the fluid supply system 200 may have a maximum flow rate or cannot flow at all.

According to the above descriptions, a size of the overlapping area of the first outlet opening 344a and the second outlet opening 352 influences the flow rate of the fluid flowing into the pipe 220a through the magnetic valve 300, and the fluid injection member 120 is connected to the pipe 220a. Therefore, according to different positions of the fluid supply system 200 on the server rack, the size of the overlapping area of the first outlet opening 344a and the second outlet opening 352 can be suitably adjusted to adjust the flow rate of the fluid.

Figure 12:
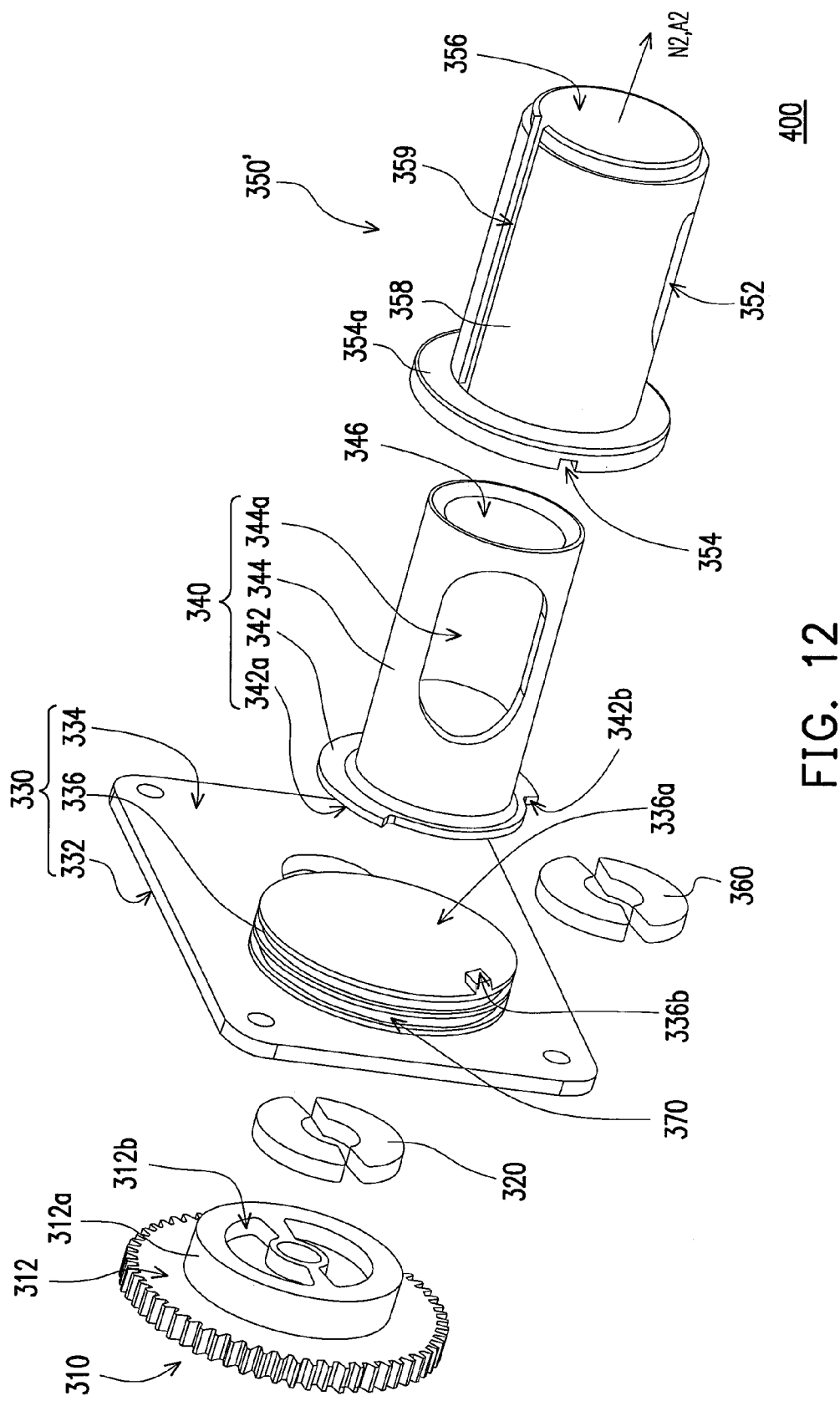
FIG. 12 is a schematic diagram of a magnetic valve according to a second embodiment of the invention.

FIG. 12 is a schematic diagram of a magnetic valve according to a second embodiment of the invention. Referring to FIG. 12, different to the first embodiment, a second spool 350' of the present embodiment has a second leaning portion 354a, a second sheath portion 358 and a slit 359, wherein the second leaning portion 354a and the first leaning portion 342 are sleeved to each other, and a second normal direction N2 of the second leaning portion 354a is parallel to a second axial direction A2 of the second sheath portion 358. The second leaning portion 354a is disposed at one end of the second sheath portion 358, the second sheath portion 358 has the second outlet opening 352, the slit 359 is disposed on the second sheath portion 358 and is located aside the second outlet opening 352, and the slit 359 penetrates through the second sheath portion 358 along the axial direction A2 of the second sheath portion 358. The second sheath portion 358 has a deformation margin due to configuration of the slit 359, which avails improving smoothness of relative rotation between the first sheath portion 344 and the second sheath portion 358.

In detail, in the fluid supply system using the magnetic valve 400 of the present embodiment, a high temperature fluid may flow through the magnetic valve 400. Therefore, to ensure a smooth rotation of the first sheath portion 344 relative to the second sheath portion 358, a thermal expansion coefficient of the second spool 350' is greater than a thermal expansion coefficient of the first spool 340.

Particularly, when the high temperature fluid flows through the magnetic valve 400, the first spool 340 and the second spool 350' with different thermal expansion coefficients have different deformation amounts. Although during the fabrication of the first spool 340 and the second spool 350', a material with a larger thermal expansion coefficient is used to fabricate the second spool 350', and a material with a smaller thermal expansion coefficient is used to fabricate the first spool 340, deformations of the first spool 340 and the second spool 350' still influence the rotation smoothness of the first spool 340 relative to the second spool 350'. Configuration of the slit 359 ensures the second spool 350' to have a margin for elastic deformation, so that when the first spool 340 rotates relative to the second spool 350', even if the deformed first spool 340 and the second spool 350' are not matched in shape or size, since the second sheath portion 358 of the second spool 350' has the slit 359, the second sheath portion 358 can be further deformed in response to the deformation of the first sheath portion 344, and the first spool 340 can smoothly rotate relative to the second spool 350'.

Figure 13:
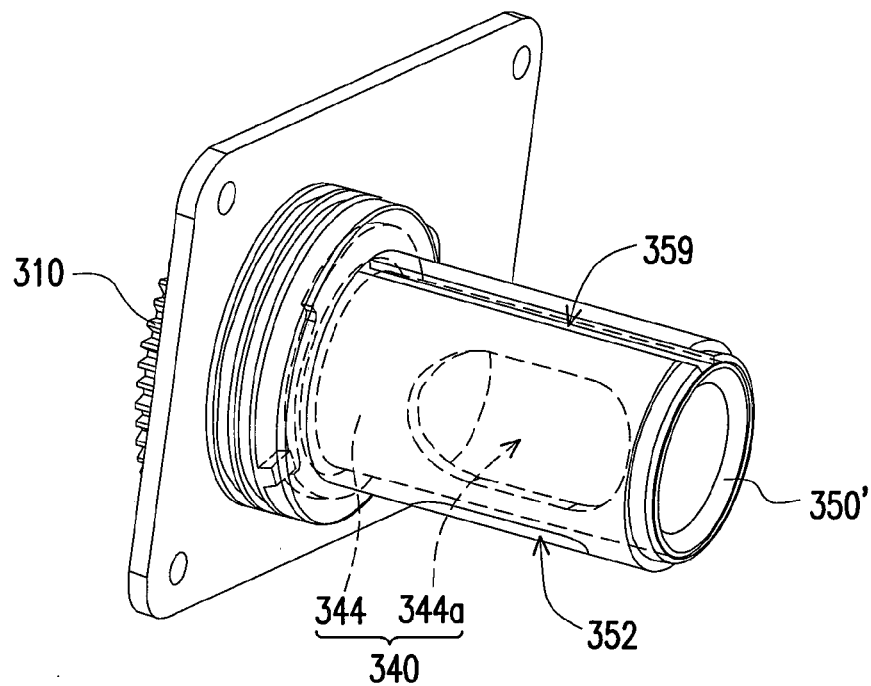
FIG. 13 and FIG. 14 are schematic diagrams illustrating relative rotation between a first spool and a second spool of the magnetic valve of FIG. 12.
Figure 14:
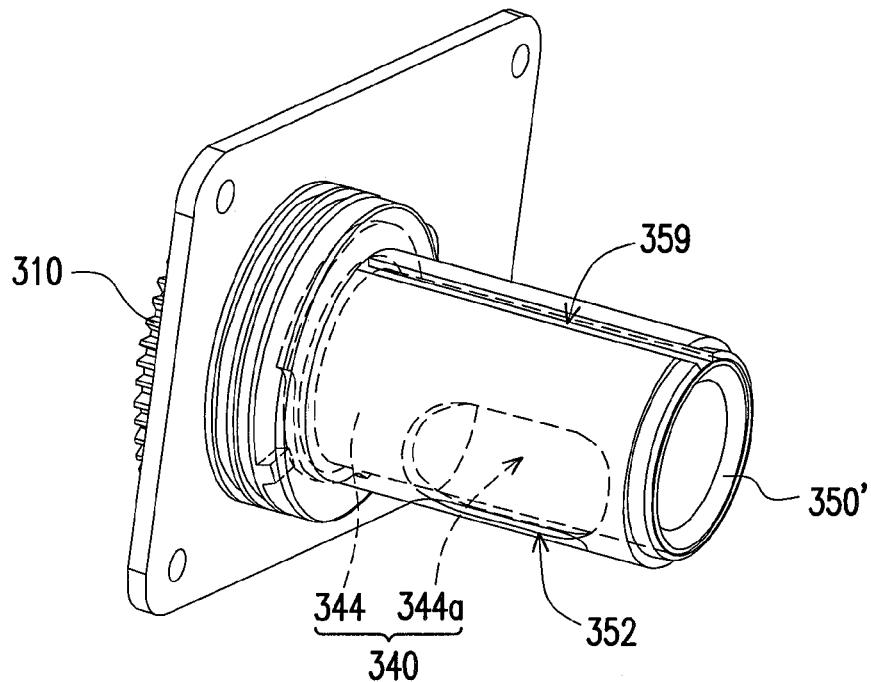

It should be noticed that the slit 359 is disposed on the second sheath portion 358 of the second spool 350' at a place not overlapped to the first outlet opening 344a, so as to avoid overlapping of the first outlet opening 344a and the slit 359 to cause the fluid leakage. In other words, when the first spool 340 rotates relative to the second spool 350', the slit 359 is not disposed on a path that the first outlet opening 344a rotates relative to the second spool 350', as that shown in FIG. 13 and FIG. 14. Certainly, other manners can also be used to prevent the fluid leakage caused by overlapping of the first outlet opening 344a and the slit 359, for example, when a viscosity coefficient of the fluid is large, and a fissure size of the slit 359 is small but is still enough to provide elastic margin, the effect of preventing the fluid leakage can still be achieved.

In summary, a structure of the magnetic valve of the invention is totally different to that of the conventional valve, and the O-ring of the magnetic valve of the invention is disposed on the cover plate that does not influence relative rotation of the two spools. Moreover, since the O-ring is not disposed between the two spools, the two spools can fluently rotate relative to each other. By applying the magnetic valve to the fluid supply system, since the O-ring is disposed on the engaging portion of the cover plate that does not influence the relative rotation of the two spools, the O-ring can seal a space between the cover plate and the pipe wall, so as to effectively prevent fluid leakage.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A fluid supply system, comprising:
a flow channel, having a pipe wall;
a magnetic valve, penetrating through the pipe wall of the flow channel to control a flow rate of a fluid in the flow channel, and the magnetic valve comprising:
a driving unit, located outside the pipe wall of the flow channel;
at least one first magnet, disposed on the driving unit;
a first spool, having a first leaning portion and to first sheath portion, wherein the first leaning portion is disposed at one end of the first sheath portion, and the first sheath portion has a first outlet opening;
a cover plate, disposed between the driving unit and the first spool;
at least one second magnet, disposed on a surface of the first leaning portion facing the cover plate; and
a second spool, fixed to the flow channel, and penetrating through the pipe wall, wherein the second spool sleeves the first spool and has a second outlet opening.

2. The fluid supply system as claimed in claim 1, further comprising a motor and a transmission member, wherein the motor and the transmission member are connected, the transmission member is engaged to the driving unit, and the motor drives the transmission member to drive the driving unit to rotate.

3. The fluid supply system as claimed in claim 1, wherein the driving unit has a first engaging portion, the cover plate has a first containing slot, and the first engaging portion is correspondingly contained in the first containing slot, while the first engaging portion has at least one first magnet containing slot, and the at least one first magnet is correspondingly disposed in the at least one first magnet containing slot.

4. The fluid supply system as claimed in claim 1, further comprising at least one O-ring, the cover plate further has a second engaging portion, the second engaging portion is convex to the first sheath portion, and the O-ring sleeves the second engaging portion to seal a space between the second engaging portion and the pipe wall.

5. The fluid supply system as claimed in claim 2, wherein the second engaging portion has a convex pillar, an edge of the first leaning portion has a position limiting gap, and the convex pillar is disposed in the position limiting gap to limit a rotation angle of the first spool relative to the cover plate.

6. The fluid supply system as claimed in claim 5, wherein the second spool further has a positioning gap communicated to the position limiting gap of the first leaning portion, wherein shapes and sizes of the convex pillar and the positioning gap are matched, and the convex pillar and the positioning gap are engaged to each other to fix a relative position between the cover plate and the second spool.

7. The fluid supply system as claimed in claim 1, wherein the first leaning portion has at least one second magnet containing slot, and the at least one second magnet is correspondingly disposed in the at least one second magnet containing slot.

8. The fluid supply system as claimed in claim 1, wherein magnetic poles of the first magnets and the second magnets that face each other are different for attraction.

9. The fluid supply system as claimed in claim 1, further comprising a casing and a fluid injection member, wherein the flow channel is disposed in the casing, and the fluid injection member and the magnetic valve respectively penetrate through the casing and the flow channel.

10. The fluid supply system as claimed in claim 1, wherein the second spool has an end opening, and the first spool has a third outlet opening, and the first spool penetrates through the end opening of the second spool, and when the first outlet opening and the second outlet opening are partially overlapped, the fluid flows in the flow channel through the third outlet opening and out of an overlapped portion of the first outlet opening and the second outlet opening.

11. The fluid supply system as claimed in claim 1, wherein the second spool has a second leaning portion, a second sheath portion and a slit, the second leaning portion and the first leaning portion are sleeved to each other, the second leaning portion is disposed at one end of the second sheath portion, the second sheath portion has the second outlet opening, the slit is disposed on the second sheath portion and is located aside the second outlet opening, and the slit penetrates through the second sheath portion along an axial direction of the second sheath portion.

12. A magnetic valve, comprising:
a driving unit;
at least one first magnet, disposed on the driving unit;
a first spool, having a first leaning portion and a first sheath portion, wherein the first leaning portion is disposed at one end of the first sheath portion, the first sheath portion has a first outlet opening, and an edge of the first leaning portion has a position limiting gap;
a cover plate, disposed between the driving unit and the first spool and a having a second engaging portion, wherein the second engaging portion is convex to the first sheath portion, a surface of the second engaging portion facing the first leaning portion has a convex pillar, and the convex pillar is disposed in the position limiting gap to limit a rotation angle of the first spool relative to the cover plate;
at least one second magnet, disposed on a surface of the first leaning portion facing the cover plate;
a second spool, sleeving the first spool, and having a second outlet opening, wherein the second spool has a second leaning portion, a second sheath portion and a slit, the second leaning portion is disposed at one end of the second sheath portion, and the slit is disposed on the second sheath portion and is located aside the second outlet opening; and
at least one O-ring, sleeving the second engaging portion.

13. The magnetic valve as claimed in claim 1, further comprising a motor and a transmission member, wherein the motor and the transmission member are connected, the transmission member is engaged to the driving unit, and the motor drives the transmission member to drive the driving unit to rotate.

14. The magnetic valve as claimed in claim 1, wherein the driving unit has a first engaging portion, the cover plate has a first containing slot, and the first engaging portion is correspondingly contained in the first containing slot, while the first engaging portion has at least one first magnet containing slot, and the at least one first magnet is correspondingly disposed in the at least one first magnet containing slot.

15. The magnetic valve as claimed in claim 1, wherein the first leaning portion has at least one second magnet containing slot, and the at least one second magnet is correspondingly disposed in the at least one second magnet containing slot.

16. The magnetic valve as claimed in claim 1, wherein magnetic poles of the first magnets and the second magnets that face each other are different for attraction.

17. The magnetic valve as claimed in claim 1, wherein the second spool further has a positioning gap communicated to the position limiting gap of the first leaning portion, wherein shapes and sizes of the convex pillar and the positioning gap are matched, and the convex pillar and the positioning gap are engaged to each other to fix a relative position between the cover plate and the second spool.

18. The magnetic valve as claimed in claim 1, wherein the second leaning portion and the first leaning portion are sleeved to each other, the second sheath portion has the second outlet opening, and the slit penetrates through the second sheath portion along an axial direction of the second sheath portion.

* * * * *